(12) United States Patent
Kucherov et al.

(10) Patent No.: US 11,237,964 B2
(45) Date of Patent: Feb. 1, 2022

(54) CACHING TECHNIQUES FOR MIGRATING AND REPLICATING DATA

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 16/398,427

(22) Filed: Apr. 30, 2019

(65) Prior Publication Data

US 2020/0349074 A1 Nov. 5, 2020

(51) Int. Cl.
*G06F 12/0815* (2016.01)
*G06F 12/0862* (2016.01)
*G06F 3/06* (2006.01)

(52) U.S. Cl.
CPC .......... *G06F 12/0815* (2013.01); *G06F 3/065* (2013.01); *G06F 3/067* (2013.01); *G06F 3/0619* (2013.01); *G06F 3/0647* (2013.01); *G06F 12/0862* (2013.01); *G06F 2212/1032* (2013.01); *G06F 2212/602* (2013.01)

(58) Field of Classification Search
CPC ...... G06F 3/0619; G06F 3/0647; G06F 3/065; G06F 3/067; G06F 12/0815; G06F 12/0862; G06F 2212/1032; G06F 2212/602
USPC .......................................................... 711/141
See application file for complete search history.

(56) References Cited

U.S. PATENT DOCUMENTS

| | | | | |
|---|---|---|---|---|
| 7,590,639 | B1 * | 9/2009 | Ivanova | G06F 16/2365 |
| 7,809,764 | B2 * | 10/2010 | Mak | G06F 16/27 |
| | | | | 707/802 |
| 9,674,087 | B2 * | 6/2017 | Jackson | H04L 69/22 |
| 9,720,947 | B2 * | 8/2017 | Aron | G06F 11/1435 |
| 10,061,654 | B1 * | 8/2018 | Patwardhan | G06F 11/1451 |
| 2003/0037206 | A1 * | 2/2003 | Benfield | G06F 16/24552 |
| | | | | 711/133 |
| 2004/0034746 | A1 * | 2/2004 | Horn | G06F 12/0866 |
| | | | | 711/141 |
| 2006/0259949 | A1 * | 11/2006 | Schaefer | H04L 63/08 |
| | | | | 726/1 |
| 2007/0198478 | A1 * | 8/2007 | Yu | G06F 16/256 |

(Continued)

*Primary Examiner* — Reginald G Bragdon
*Assistant Examiner* — Aaron D Ho
(74) *Attorney, Agent, or Firm* — Muirhead and Saturnelli, LLC

(57) ABSTRACT

Techniques for processing data include: receiving a hierarchical structure of metadata (MD) pages for a logical device; and performing processing to copy data of the logical device from a source system to a target system. The first processing includes: determining a sequence of the MD pages in accordance with a depth first traversal of the hierarchical structure; defining a cache management policy in accordance with the sequence that indicates when to load the MD pages into a cache and when to remove the MD pages from the cache; loading MD pages into, and removing MD pages from, the cache in accordance with the cache management policy; and copying data pages stored at logical addresses of the logical device in an order in which the logical addresses are accessed using MD pages stored in the cache at various points in time in accordance with the cache management policy.

22 Claims, 11 Drawing Sheets

(56) References Cited

U.S. PATENT DOCUMENTS

| | | | | |
|---|---|---|---|---|
| 2008/0301650 | A1* | 12/2008 | Talluri | G06F 11/3409 |
| | | | | 717/135 |
| 2011/0010502 | A1* | 1/2011 | Wang | G06F 12/128 |
| | | | | 711/128 |
| 2011/0258391 | A1* | 10/2011 | Atkisson | G06F 12/0804 |
| | | | | 711/118 |
| 2012/0210066 | A1* | 8/2012 | Joshi | G06F 12/0811 |
| | | | | 711/118 |
| 2015/0281389 | A1* | 10/2015 | Firsov | G06F 16/282 |
| | | | | 709/214 |
| 2017/0083406 | A1* | 3/2017 | Qi | G06F 16/9027 |
| 2018/0267985 | A1* | 9/2018 | Badey | G06F 16/128 |
| 2020/0050648 | A1* | 2/2020 | Garg | G06F 16/2246 |

\* cited by examiner

| | MD page TOP 302 | MD page MID1 304 | MD page LEAF1 310 | MD page LEAF2 312 | MD page MID2 306 | MD page LEAF3 314 | MD page LEAF4 316 | MD page MID3 308 | MD page LEAF5 318 | MD page LEAF6 320 |
|---|---|---|---|---|---|---|---|---|---|---|
| T1 | Add 501a | Add 501b | Add 501c | | | | | | | |
| T2 | | | Remove 502a | Add 502b | | | | | | |
| T3 | | Remove 503a | | Remove 503b | Add 503c | Add 503d | | | | |
| T4 | | | | | | Remove 504a | Add 504b | | | |
| T5 | | | | | Remove 505a | | Remove 505b | Add 505c | Add 505d | |
| T6 | | | | | | | | | Remove 506a | Add 506b |

510

500

| T1: | TOP 302, MID1 304, LEAF1 310 | — 520a |
| T2: | TOP 302, MID1 304, LEAF2 312 | — 520b |
| T3: | TOP 302, MID2 306, LEAF3 314 | — 520c |

| T4: | TOP 302, MID2 306, LEAF4 316 | — 520d |
| T5: | TOP 302, MID3 308, LEAF5 318 | — 520e |
| T6: | TOP 302, MID3 308, LEAF6 320 | — 520f |

CACHING TECHNIQUES FOR MIGRATING AND REPLICATING DATA

TECHNICAL FIELD

This application generally relates to data storage and, more particularly, to caching techniques.

DESCRIPTION OF RELATED ART

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data: receiving a hierarchical structure of metadata (MD) pages for a logical device; and performing first processing to copy data stored on the logical device from a source system to a target system, the first processing including:

determining a sequence of the MD pages of the logical device in accordance with a depth first traversal of the hierarchical structure; defining a cache management policy in accordance with the sequence that indicates, at various points in time, when to load the MD pages into a cache and when to remove the MD pages from the cache; loading the MD pages into the cache and removing MD pages from the cache at the various point in time and in accordance with the cache management policy; and copying data pages stored at logical addresses of the logical device from the source system to the target system, wherein said copying of the data pages is performed in an order in which the logical addresses are accessed using one or more of the MD pages stored in the cache at the various points in time in accordance with the cache management policy. The hierarchical structure may be a tree. The tree may include 3 levels, wherein the 3 levels may include a first MD page as a root at a first level, a first plurality of MD pages at a second level, and a second plurality of MD pages at a third level. The first plurality of MD pages may be children of the first MD page, and each MD page of the second plurality of MD pages of the third level may be a child of one of the MD pages of the first plurality of MD pages of the second level. The second plurality of MD pages at the third level may be leaf MD pages, and each of the leaf MD pages may access one or more pages of data stored on the logical device. M may denote a maximum number of MD pages allowed to be stored in the cache, and M may be greater than or equal to a number of levels in the hierarchical structure. The cache management policy may indicate that each of the leaf MD pages of the third level is removed from the cache after processing is completed for copying data, stored at logical addresses of the logical device accessed by said each leaf MD page, from the source system to the target system. The cache management policy may indicate that when a leaf MD page of the third level is loaded in the cache, then the first MD page that is the root and the parent MD page of the leaf MD page are resident in the cache. The cache management policy may indicate that a parent MD page of the tree remains resident in the cache until processing of all child MD pages of the parent MD page has completed. M may be greater than or equal to a number of levels in the tree and the cache management policy may include one or more rules that indicate when to prefetch one or more MD pages of the tree into the cache. The data pages accessed by the leaf MD pages may be directly copied, over a network connection, from one or more physical storage devices of the source system to one or more other physical storage devices of the target system without storing the data pages in the cache of the source system. The data pages accessed by the leaf MD pages may be copied from one or more physical storage devices of the source system to the cache of the source system, and then may be transmitted from the cache of the source system to the target system over a network connection. The first processing, that copies data of the logical device from the source system to the target system, may be included in processing performed for replicating or migrating data of the logical device from the source system to the target system. The source system may be a data storage system and the target system may be a second data storage system.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6, 7 and 8 are examples further illustrating use of the techniques described herein;

DETAILED DESCRIPTION OF EMBODIMENT(S)

Figure 1:
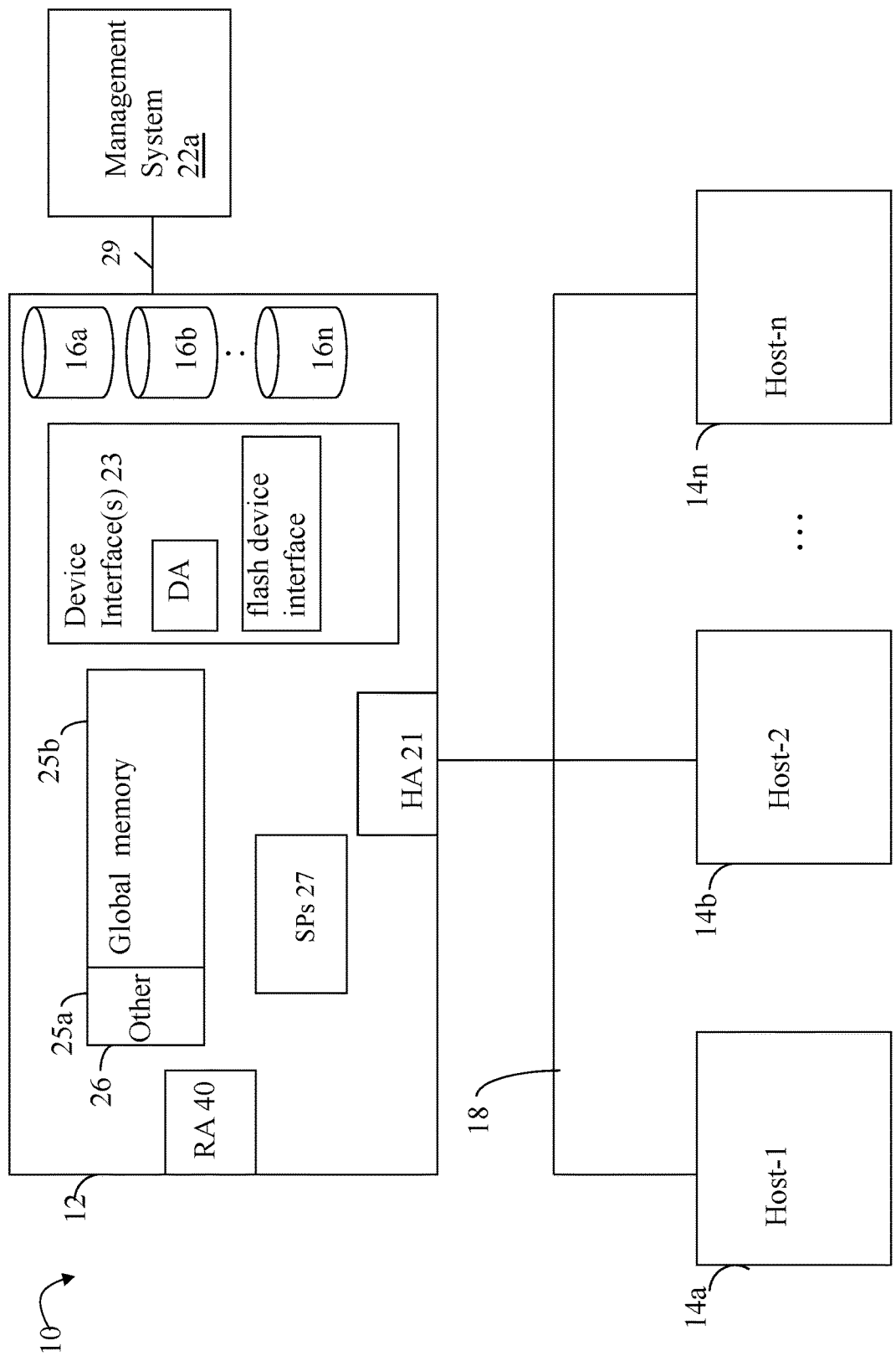
FIG. 1 is an example of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In connection with a data storage system such as described herein, an I/O request may be a read request to read data. The read request may be received at the data storage system at a port of a front-end component of the data storage system (such as one of the HAs as described elsewhere herein). In terms of processing a read request (e.g. the read I/O path), a determination may be made as to whether all the requested read data is in cache (e.g., a cache hit where read data is stored in data cache). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations and write I/O path processing, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical non-volatile storage of the back end PDs. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

As data for I/Os and other processing is stored in the cache, a cache memory location, such as a cache slot or cache page, may be allocated for use in storing such data. At various points in time, there may not be any free or available cache or the amount of free or available cache may reach a minimum threshold level. In response to such conditions and possibly others, processing may be performed in connection with cache management to obtain a free or available cache location such as by evicting one or more cache pages. Generally, any suitable cache management technique known in the art may be used to manage the cache. For example, an embodiment may employ the least recently used (LRU) cache management technique which may remove data from cache based on when the data has been last referenced. For example, a time stamp may be associated with each data portion stored in the cache where the time stamp denotes the last time (e.g., date, hour, minutes, seconds in terms of wall clock time) the data portion was referenced. The most recently referenced data may have the most recent time stamp and may remain in the cache longer than other data referenced having older time stamps. The foregoing time stamps may be used to select particular data for eviction when a new cache location is needed to store new data. The foregoing time stamps may also be used in a proactive cache management technique, for example, to select data for removal when the amount of free or available cache falls below a specified amount.

Although not illustrated in FIG. 1 for simplicity and as known by those of ordinary skill in the art, an embodiment may store additional information for cached data, such as read and write data described above that may be stored in the data cache. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache to retrieve and/or store data from the cache. For example, the HA may manage and/or use cache mapping information that maps a LUN and LUN offset to a cache location including data stored at the LUN offset on the particular LUN. The DA may manage and/or use cache mapping information mapping a PD and offset on the PD to a cache location including data stored at the offset on the particular PD for use in destaging write data from cache to backend non-volatile PDs 16*a-n*.

Data storage systems may include different storage tiers having different types of non-volatile storage media. For example, as noted above, in at least one embodiment, the data storage system may include one or more tiers of rotating disk drives and include a tier of SSD drives (e.g., flash-based storage drives). Data portions may be proactively moved or relocated between different storage tiers. For example, consider a multi-tiered storage system with 3 storage tiers—an SSD tier of flash-based drive, a tier of 15 K RPM rotating disk drives and a tier of 10 K RPM rotating disk drives. The foregoing 3 storage tiers may be ranked based on performance where the SSD tier may be ranked as the highest, the tier of 15 K RPM drives ranked second highest and the tier of 10 K RPM dries ranked lowest/least in terms of performance. A data portion, such as mapped to a subrange of a LUN logical address space, may be relocated between different ones of the foregoing 3 tiers in an automated fashion based on the temperature or frequency of access of I/Os to the data portion at various points in time. At a first point in time, the data portion may be accessed frequently for reading and/or writing and may be stored in the SSD tier. At a second later point in time, the data portion's frequency of access may be greatly reduced (e.g., idle) and may be relocated, via demotion, from the SSD tier to a lower performing tier, such as the 10 K or 15 K RPM tier. At yet a third point in time subsequent to the second point in time, the data portion may be frequently accessed again and may be promoted to a higher performing tier (e.g., relocated from the 10 K or 15 K RPM tier to the SSD tier).

Figure 2:
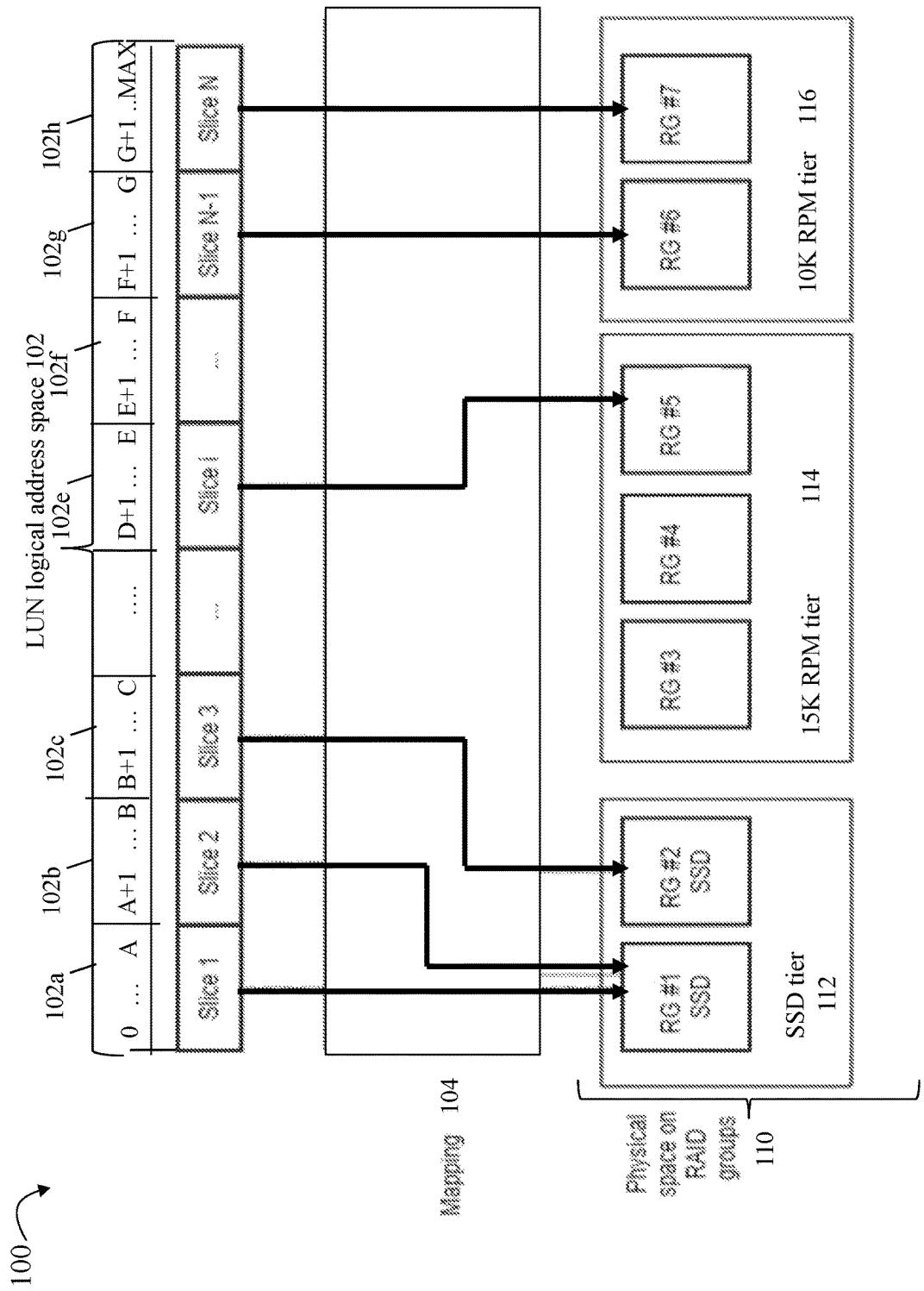
FIG. 2 is an example illustrating logical to physical mapping that may be used in an embodiment in accordance with techniques herein.

Referring to FIG. 2, shown is an example illustrating logical to physical mapping in a data storage system. The example 100 illustrates how the logical address space or range of a LUN 102 is mapped via mapping layer 104 to different slices, segments or more generally, portions of physical memory of non-volatile physical storage devices (110) providing back-end data storage, such as denoted by PDs 16*a-n* in FIG. 1. The example 100 include storage tiers 112 (SSD tier), 114 (15 K RPM tier) and 116 (10 K RPM tier) comprising the PDs 110 as noted above. Element 102 may denote the LUN's logical address space, having a starting logical address, block or offset of 0, and an ending maximum logical address, MAX. The LUN's logical address space 102 in the example 100 is partitioned into equal logical address space portions (denoted by 102*a-h*) where each of the portions 102*a-h* is mapped to region of physical storage, also referred to as slices or segments, on the different PDs of different ones of the storage tiers of 110. As noted above, data storage system software may periodically remap portions of the LUN's logical address space to keep the most actively used or accessed portions of 102*a-n* on slices of the highest performance tier 112 in efforts to maximum data storage system I/O performance. As shown in FIG. 2, PDs of the tiers 112, 114 and 116 may be configured into RAID groups (denoted as RG #1-7 in FIG. 2) each having a suitable RAID level to provide data protection.

In connection with user data that is written to a LUN and then stored on the PDs, or more generally, back-end non-volatile storage devices, various types of metadata (MD) may also be stored. The MD may include, for example, various structures used to access the stored user data, attributes about the LUN, and the like. To further illustrate, the MD for a LUN may include location information identifying where the user data is stored on physical storage such as disks or flash-based non-volatile storage. Consistent with discussion herein, the data storage system may receive a host I/O that reads or writes data to a target location expressed as a LUN and offset, logical address, track, etc. on the LUN. The target location is a logical LUN address that may map to a physical storage location where data stored at the logical LUN address is stored. Thus, one type of MD for an LBA of a LUN may include location MD identifying the physical storage location mapped to the particular LBA.

Figure 3A:
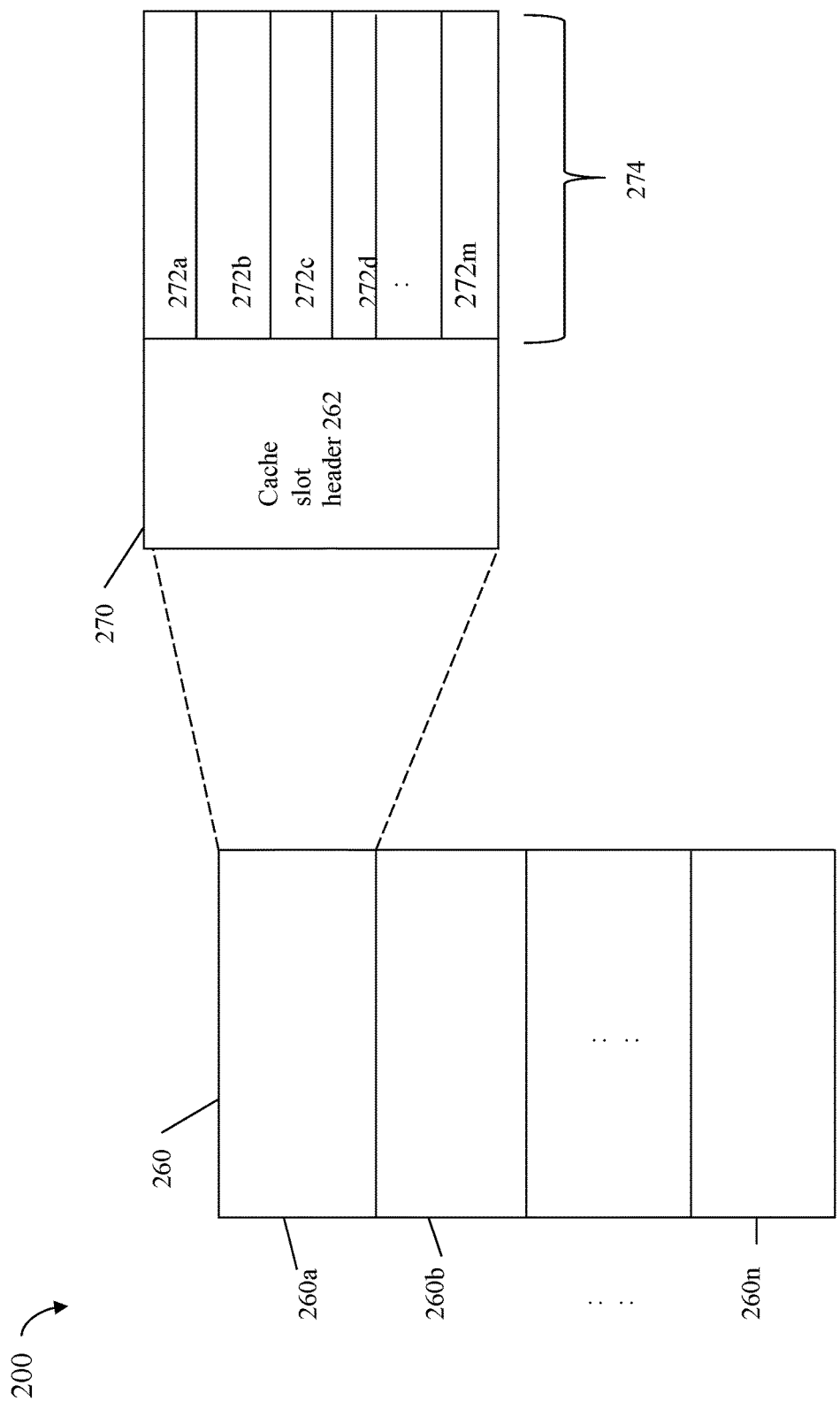
FIG. 3A is an example illustrating a logical representation of a cache in an embodiment in accordance with techniques herein.

Referring to FIG. 3A, shown is an example illustrating a logical representation of a cache that may be used in an embodiment in accordance with techniques herein. In the example 200, element 260 may represent the memory or storage used as the cache which is partitioned into cache slots or pages 260*a*-260*n*. It should be noted that the example 250 is a logical representation of a cache that may be implemented using any suitable data structure(s) known in the art. Element 270 provides additional detail of single cache slot or page 260*a* Cache slot or page 260*a* may include a cache slot or page header 262 and cache slot or page data 274. The cache slot data 274 illustrates that a single cache slot or page of data may further include multiple portions 272*a-m*. The cache slot header 262 may include additional information regarding the cached data stored in 274. For example, the header 272 may denote whether the data cached in each of the portions 272*a-m* is write pending (WP) data.

It should be noted that the particular granularity or smallest unit of storage for storing cached data may vary with embodiment. For example, each of the portions 272*a-m* may denote a smallest unit of storage for storing cached data. Additionally, the particular number of portions in a cache slot may also vary with embodiment.

When performing various data storage services, data read from and/or written to a LUN may be processed using the typical I/O or data path such as described herein. Data migration or replication is an example of such a data storage service. With reference to the FIG. 3B consider migrating or replicating data from the source or local data storage system 252 to a target or remote data storage system 262. In the example 250, a migration or replication application 270 on the source or local system 252 may be controlling the migration or replication of data from the source LUN A 254 on the system 252 to the target LUN A" 264 on the target or remote system 262. When performing such migration, the data may be read from LUN A 254, stored in the cache 255 of the system 252, and then transmitted to the system 262. Once the transmitted data is received at the system 262, the data may be stored in the cache 265 of the system 262 and then written to the physical storage provisioned for the LUN A" 264. In some existing implementations, the data read from the LUN A 254 on the source or local system 252 may be processed along the read I/O path as described above where the data read is stored in the cache 255. Generally, migrating the data for LUN A 254 includes reading MD as well as user data into cache 255. For example, MD describing the physical storage location for LUN A, LBA 5 may be read from a backend PD and stored in cache 255. Subsequently, the cached MD may be read to determine the physical storage location for the user data stored at LUN A, LBA 5. Processing may proceed to read such user data for LUN A, LBA 5 from a backend PD of the system 252 into the cache 255. However, in performing this processing, the cache 255 of the source or local data storage system 252 is filled with user data and MD for LUN A 254 which is not further used on the source or local data storage system 252. Such data read into cache 255 for the LUN A 254 may be used only once for replication or migration whereby such data may not be further needed. In a system not using the techniques herein, the data, both user data and MD, for LUN A 254 needed for the migration may be stored in the cache 252 and remain in the cache 252 until removed based on the particular cache management policy of the cache 252.

When performing the migration or replication, it may be desirable to keep or retain in the cache as much of the MD needed for the migration (e.g., of the LUN) as possible. Furthermore, a data storage system may generally attempt to store as much MD for all LUNs as possible in the cache 255. However, the cache, such as the cache 255 of the system 252, may be a limited resource and there may not be a sufficient amount of cache to store all the needed MD, such as for the LUN A 254 and other LUNs, in the cache 255. As a result, the data storage system 252 may store the more frequently accessed MD for the LUNs in the cache with remaining MD for the LUNs stored on the backend PDs. As may be needed, the MD for the LUNs stored on a backend PD may be loaded into the cache 255.

Described in following paragraphs are techniques that may be used in connection with a data service, such as migration or replication of a LUN, for improved caching in connection with data needed for the migrations or replication. The data for the LUN being migrated may bypass the typical read I/O path and provide for more efficient utilization of the cache. The techniques provide an approach that leverages the knowledge of the known I/O access pattern of the migration or replication application when migrating the LUN's data. Such knowledge or known I/O access pattern of the migration or replication application may be used to control what particular MD for the LUN is needed in the cache at particular points in time, and how long such MD for the LUN is retained in the cache. The foregoing and other aspects of the techniques herein are described in more detail in following paragraphs.

Generally, the techniques herein use the particular order in which the MD of the LUN will be accessed and used by the migration or replication application 270 to specify the rules or a separate policy for cache management of the LUN's MD. In at least one embodiment, the MD pages for the LUN used by the migration or replication may be stored in a read cache that is separate from the general data cache that may be used in connection with performing other operations, such as for servicing read and write I/Os. As a variation, the MD pages for the LUN used by the migration or replication may be stored in the same data cache that may be used in connection with performing other operations, such as for servicing read and write I/Os. However, any cache slots or pages of the cache storing the MD for the LUN being migrated may be managed using a separate cache management policy or rules that differ from the general cache management policy, such as LRU, that may otherwise be used for managing the cache 255.

In at least one embodiment, the migration or replication application on the local source data storage system may be controlling or driving the data migration or replication processing. The application may perform processing that reads the data, both MD and user data, from the LUN A 254 in a particular predetermined order, for example, that may be encoded in the logic of the executed code of the application. Thus, the I/O access pattern with respect to the MD and user data of LUN A 254 that is read by the application 270 is known. Techniques herein use this known I/O access pattern (with respect to a sequence in which MD and user data of the LUN 254 is accessed) to selectively load and unload from the cache particular MD pages at various points in time during the migration or replication controlled by the application.

In at least one embodiment, the MD for the LUN A 254 being migrated or replicated may be in the form of a tree having a plurality of levels. More generally, the MD may be in the form of any hierarchical structure. In at least one embodiment, the MD for the LUN A may be in the form of a tree having 3 levels including a single top or root node, a single mid-level and a bottom level of leaf nodes, where each of the MD page leaf nodes may point to, or reference (directly or indirectly) one or more pages of stored data, such as user data stored on the LUN A. Each node in the tree may correspond to a MD page including MD for the LUN A 254. More generally, the tree or other hierarchical structure of various MD pages for the LUN A 254 may include any suitable number of levels, such as more than 3 levels where there are multiple mid-levels. In at least one embodiment the tree of MD pages for the LUN may be an "N-ary" tree, where "N" indicates that each node in the tree structure may have up to a maximum of N child nodes. For example, in at least one embodiment, the tree of MD pages for the LUN may specify N=512 whereby each node in the tree structure may have up to a maximum of N child nodes. For simplicity of illustration, following paragraphs refer to a tree structure of MD pages including only 3 levels where each node in the tree may have at most 3 child nodes.

As generally known in the art, depth-first search (DFS) is an algorithm for traversing or searching tree or graph data structures. The algorithm starts at the root node (selecting some arbitrary node as the root node in the case of a graph) and explores as far as possible along each path extending from the root to a leaf node before backtracking up the path to find a yet another unexplored path. A preordering is a list of the nodes in the order that they are first visited by the DFS algorithm.

In at least one embodiment, the replication or migration application 270 may traverse the tree of MD pages in a depth-first manner and migrate data stored on the LUN A 254 based on such a depth-first traversal. In at least one embodiment, the depth-first traversal of the tree of MD pages may explore all paths, in sequential order, from the left-most path to the right most path as arranged in the tree. The preordering list of the nodes visited by the depth-first traversal may denote the order in which MD pages of the tree are loaded into the cache. Such MD pages may then be subsequently unloaded from the cache, evicted from the cache, or otherwise marked as free or available cache pages as each such MD page no longer needs to be loaded in the cache for use with migration processing.

Figure 4:
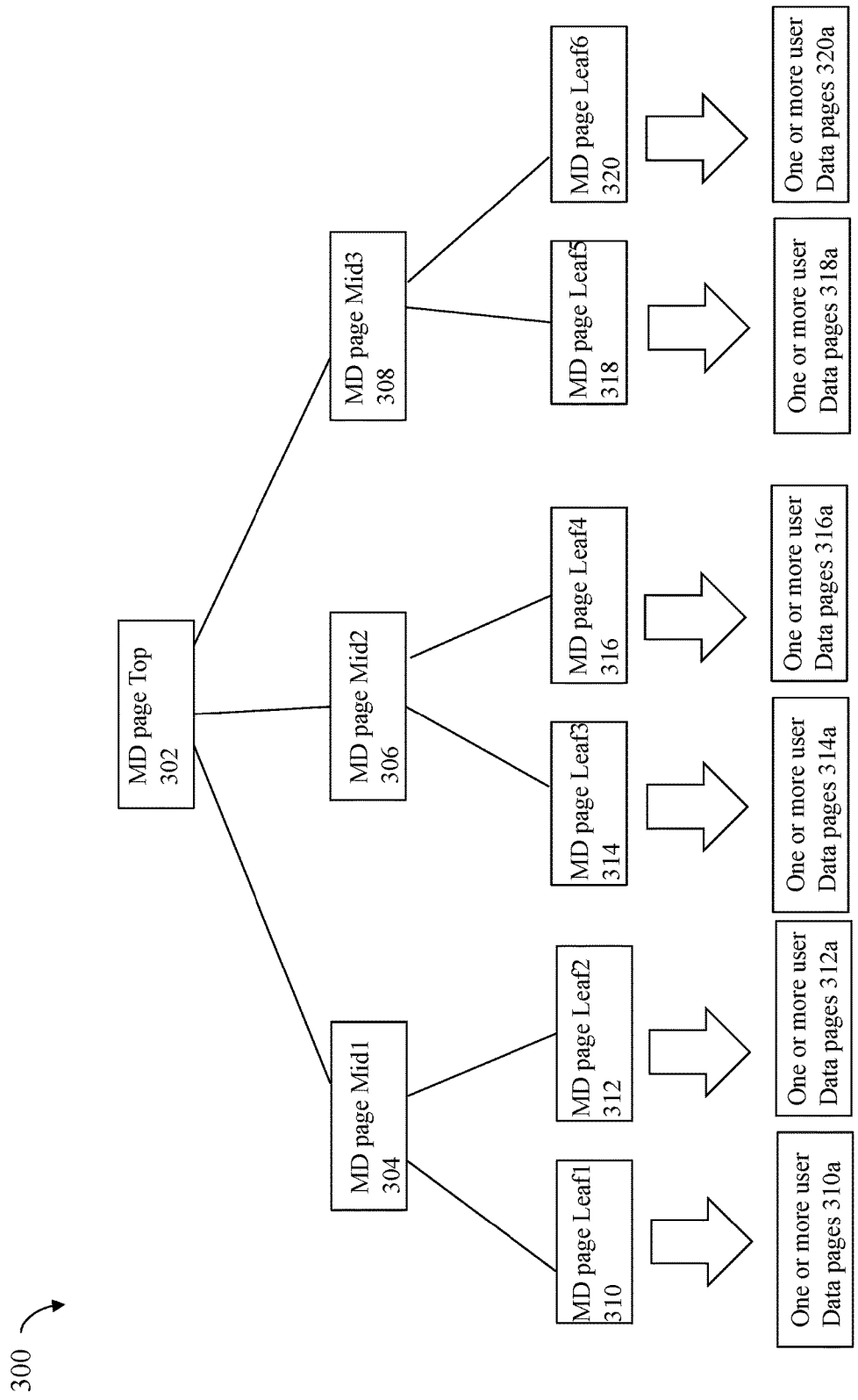
FIG. 4 is an example illustrating a tree of MD pages that may be used in an embodiment in accordance with the techniques herein.

Referring to FIG. 4, shown is an example of a tree of MD pages that may be used in an embodiment in accordance with the techniques herein. The example 300 includes a tree of MD pages as noted above with 3 levels—a top or root level, level 1, including a single MD page; a single mid or middle level, level 2, of MD pages; and a bottom level, level 3, of leaf nodes of MD pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which may also be referred to as leaf nodes. As also illustrated in the example 300, each of the leaf MD pages in level 3 of the tree points to, or references, one or more user data pages (e.g., pages of data stored on the LUN A 254). For example, MD pages 310, 312, 314, 316, 318 and 320 point or reference, respectively, one or more user data pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node may include a reference used to access (directly or indirectly) each of its one or more child nodes. For example, the root node MD page top 302 may include addresses or pointers used to access each of its child nodes 304, 306 and 308. The mid-level node MD page mid1 304 may include addresses or pointers used to access each of its child leaf nodes 310, 312. The mid-level node MD page mid1 306 may include addresses or pointers used to access each of its child leaf nodes 314, 316. The mid-level node MD page mid1 308 may include addresses or pointers used to access each of its child leaf nodes 318, 320. In this manner, when performing the depth-first traversal of the tree 300, in order to avoid reloading any MD pages, processing may retain in the cache each node until all its children have been traversed and processed as needed for the migration or replication. More specifically, when performing the depth-first traversal of the nodes corresponding to the MD pages, a MD page may be loaded into the cache based on the preordering list as noted above. A MD page is retained in the cache until all paths extending from its child nodes have been fully traversed. Subsequently, the MD page may be removed from the cache. In this manner, no MD page needs to be reloaded into the cache and once loaded into the cache, remains in the cache until it is no longer needed for the migration or replication process to access any other stored data or MD.

Figure 5:
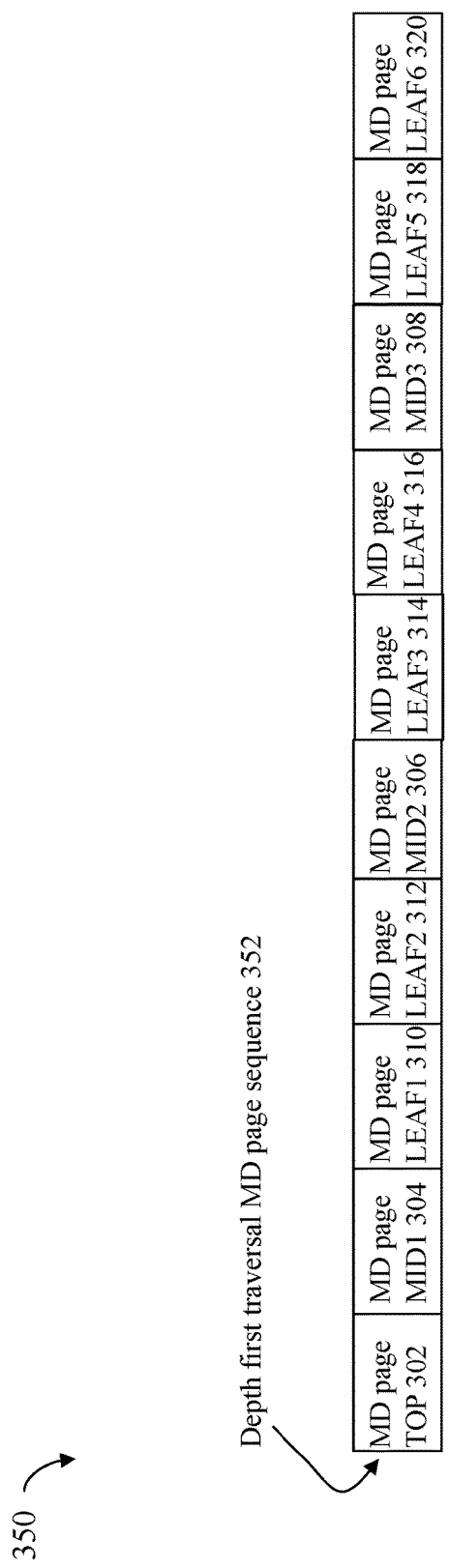
FIG. 5 is an example illustrating a defined MD pages sequence that may be used in an embodiment in accordance with the techniques herein.

Referring to FIG. 5, shown is an example 350 of the depth first traversal MD page sequence for the MD pages in the tree structure of FIG. 4. The sequence 352 denotes the following preordering list in which the nodes of the tree of FIG. 4 are first visited by the depth-first traversal: MD page top 302, MD page mid1 304, MD page leaf1 310, MD page leaf2 312, MD page mid2 306, MD page leaf3 314, MD page leaf4 316, MD page mid3 308, MD page leaf5 318, and MD page leaf6 320. In at least one embodiment, the MD pages of the tree represented in the FIG. 4 may be loaded into cache in sequential order as in the sequence 352, at various points in time as needed for the migration or replication processing. The sequence 352 denotes the order in which the MD and also the user data of the LUN A is processed by the migration or replication application 700. Thus, the sequence 352 denotes a predetermined sequential order in which the migration or replication application 700 will access the MD pages and also migrate the user data or data pages accessed while the particular MD leaf pages are loaded into the cache.

As each of the leaf MD pages 310, 312, 314, 316 and 318 is loaded into the cache based on the sequence 352, the one or more user data pages referenced or pointed to by each such MD page may be processed as needed for the migration or replication. In this manner, the migration or replication (e.g., order in which the user data or data pages is copied) may be characterized as controlled or driven by the order in which the MD pages are loaded and processed.

In at least one embodiment, the number of MD pages consumed for use with the migration or replication of the LUN A 254 may be 3, or more generally a size "M", where M is the maximum number of levels in the tree or other structure of MD pages. This size of M pages is needed to avoid having to subsequently reload any MD page into cache.

Generally, cache management of the 3 or more cache pages storing MD of the tree of FIG. 4 may include rules that specify when a MD page leaf is loaded in the cache, all MD pages on the path from the root MD page to the MD page lead are also resident in cache. Furthermore, each mid-level MD page at level 2 in FIG. 4 is not unloaded from the cache until all its child MD pages (e.g., MD page leaves) have been processed. This rule can more generally be expanded to any parent MD page whereby the parent MD page is not unloaded from the cache until all its child MD pages have been processed. Once the child MD pages have been processed, the parent MD page may be unloaded from the cache. A MD page leaf is removed from the cache when processing is completed for all data pages (e.g., logical addresses or LBAs of the LUN) accessed by the MD page leaf. Furthermore, depending on the size or maximum number of MD pages that are allowed to be stored in the cache at any point in time, the policy may include one or more rules that prefetch one or more MD pages of the tree.

Generally, the following is a pseudo-code representation of the processing flow of the MD cache pages and user data pages in such an embodiment in which 3 pages of cache storage are consumed in connection with the migration or replication of the LUN A 254:

```
Load MD page top into the cache;
For MID_ID=1 through N_MIDS_IN_TOP{
    Load MD page MID_ID into the cache;
        For LEAF_ID=1 through N_LEAVES _OF MD page MID MID_ID {
            Load MD page LEAF LEAF_ID into the cache;
            Process each data page referenced by MD page LEAF LEAF_ID;
            Unload/remove MD page LEAF LEAF_ID from the cache;
        }
    Unload/remove MD page MID MID_ID from the cache;
}
Unload/remove MD page top from the cache;
```

It should be noted that in the above pseudo-code, N_MIDS_IN_TOP denotes the number of child nodes or pages (e.g., MD page MIDs) of the root, MD page top. In one example described herein with respect to FIG. 4, N_MIDS_IN_TOP=3. Additionally, in the above pseudo-code, N_LEAVES_OF MD page MID MID_ID denotes the number of child pages or leaf nodes of each particular MD page MID, MID_ID, as the outer loop cycles through all the MD pages MIDs (e.g., where MID_ID=1 through N_MIDS_IN_TOP). In one example with respect to FIG. 4, each MD page MID has 2 leaf or child nodes therefore N_LEAVES_OF MD page MID MID_ID is 2 for all 3 MD page MIDs.

Referring to FIG. 6, shown is a first example 500 illustrating use of techniques herein where no more than 3 pages of cache storage are consumed in connection with the migration or replication of the LUN A 254. The example 500 of FIG. 6 denotes when the particular MD pages are loaded into the cache and subsequently removed or unloaded from the cache in accordance with the sequence 352 of FIG. 5 and based on the pseudo-code representation above.

Element 510 takes the form of a matrix with columns corresponding to each of the MD pages from the sequence 352 of MD cache pages. Thus, the column identifiers (IDs) denote a particular MD page of the tree of FIG. 4. Element 510 includes rows denoting 6 different points in time, T1 through T6, indicating what one or more particular MD pages are added or loaded into the cache and what one or more particular MD pages are removed or unloaded from the cache. Thus, the row identifiers (IDs) denote a particular one of the 6 points in time T1 through T6. A cell or entry in the matrix 510 may be empty, or otherwise indicates an action taken with respect to a particular MD page (as denoted by the column ID) at a particular point in time (as denoted by the row ID). An empty cell or entry of the matric 510 indicates there is no action performed with respect to the particular MD page denoted by the column ID at that particular point in time as denoted by the row ID. It should be noted that T1-T6 denotes 6 sequential consecutive points in time where T1 denotes a first of the 6 points in time, T2 denotes a second of the 6 points in time, T3 denotes a third of the 6 points in time, T4 denotes a fourth of the 6 points in time, T5 denotes a fifth of the 6 points in time, and T6 denotes a sixth or the last of the 6 points in time.

Element 520 denotes the contents of the 3 pages of cache at each of the 6 different points in time T1 through T6 based on the indicated actions denoted by the matrix 510. Generally, the matrix 510 characterizes the cache management policy or rules used for managing the 3 cache locations used for cache MD pages in connection with the migration or replication of the LUN A.

As indicated by entries 501a-c of the first row T1 of the matrix 510, at the first point in time T1, MD pages top 302, mid1 304 and leaf1 310 are loaded into the cache. Element 520a indicates the contents of the cache after the 3 MD pages 302, 304 and 310 are loaded. After the cache pages are loaded at time T1 as denoted by 520a, processing is performed for the one or more user data pages 310a mapped to, or pointed to, by the MD leaf1 page 310. As noted elsewhere herein, the data pages 310a include user data stored on particular logical addresses of the LUN A's logical address space. In at least one embodiment, such processing of the data pages identified by 310a may include reading the data pages from the back-end PDs of the system 252 and sending the data pages to the target or remote data storage system 262.

In at least one embodiment, the data pages of 310a may be sent directly to the remote system 262 without storing the data pages into the cache. In this particular case where the caches 255 and 265 are completely bypassed when migrating or replicating the user data of data pages 310a, the network protocol and fabric (e.g., such as of the SAN) over which systems 252 and 262 communicate may support such direct communication between PDs of the system 252 and other PDs of the system 262. For example, the SAN or network fabric over which systems 252 and 262 communicate may be NVM Express® (NVMe™) over Fabrics (NVMeOF). More generally, NVMeOF may be used for communications between any entities connected to the SAN or network fabric, such as between a host and a storage system, or between data storage systems.

In such an embodiment, NVMeOF may be used to write or copy data from one or more PDs provisioned for LUN A 254 of the system 252 directly to one or more other PDs provisioned for LUN A" 264 on the system 262 bypassing the caches 255 and 265 as part of the I/O path of the migration or replication data flow.

In at least one embodiment where such direct communication between PDs of the systems 252 and 262 is not supported, the user data of the data pages 310a may be loaded into the caches 255 and 265 as part of the I/O path of the migration or replication data flow. Consistent with discussion herein regarding read I/Os, the data pages 310a may be loaded from PDs of the system 252 providing backend storage for the LUN A 254 into other pages of the data cache different from the 3 particular cache slots or locations used for storing the MD pages. In such an embodiment, once the data pages 310a stored in the cache have been transmitted to the remote system 262, the cache locations including the data pages 310a may be immediately unloaded, evicted or removed from the cache, or otherwise marked as free or available for reuse. Thus, the user data of the data pages 310a, 312a, 314a, 316a, 318a and 320a may also be stored in cache pages that are managed using a separate cache management policy or rules as just described.

At time T2 after the data pages 310a accessed using MD leaf1 310 have been processed as needed for the migration or replication, processing is performed as represented by row T2 of the matrix 510. As indicated by entries 502a-b of the row T2 of the matrix 510, MD page leaf1 310 is removed from the cache and the MD page leaf2 312 is loaded into the cache. Element 520b indicates the contents of the cache after the MD page 310 is removed from the cache and after MD page 312 is loaded into the cache. At this point, processing is performed for the one or more user data pages 312a mapped to, or pointed to, by the MD leaf2 page 312. As noted elsewhere herein, the data pages 312a include user data stored on particular logical addresses of the LUN A's logical address space. In at least one embodiment, such processing of the data pages identified by 312a may include reading the data pages from the back-end PDs of the system 252 and sending the data pages to the target or remote data storage system 262. The data pages of 312a may be processed and sent to the remote system 262 in a manner similar to that as described above in connection with 310a.

At time T3 after the data pages 312a accessed using MD leaf2 312 have been processed as needed for the migration or replication, processing is performed as represented by row T3 of the matrix 510. As indicated by entries 503a-d of the row T3 of the matrix 510, MD page leaf2 312 and MD page mid1 304 are removed from the cache, and MD page mid2 306 and MD page leaf3 314 are loaded into the cache. Element 520c indicates the contents of the cache after implementing the cache removals and additions as denoted by row T3. At this point, processing is performed for the one or more user data pages 314a mapped to, or pointed to, by the MD leaf3 page 314. As noted elsewhere herein, the data pages 314a include user data stored on particular logical addresses of the LUN A's logical address space. In at least one embodiment, such processing of the data pages identified by 314a may include reading the data pages from the back-end PDs of the system 252 and sending the data pages to the target or remote data storage system 262. The data pages of 314a may be processed and sent to the remote system 262 in a manner similar to that as described above in connection with 310a.

At time T4 after the data pages 314a accessed using MD leaf3 314 have been processed as needed for the migration or replication, processing is performed as represented by row T4 of the matrix 510. As indicated by entries 504a-b of the row T4 of the matrix 510, MD page leaf3 314 is removed from the cache, and MD page leaf4 316 is loaded into the cache. Element 520d indicates the contents of the cache after implementing the cache removals and additions as denoted by row T4. At this point, processing is performed for the one or more user data pages 316a mapped to, or pointed to, by the MD leaf4 page 316. As noted elsewhere herein, the data pages 316a include user data stored on particular logical addresses of the LUN A's logical address space. In at least one embodiment, such processing of the data pages identified by 316a may include reading the data pages from the back-end PDs of the system 252 and sending the data pages to the target or remote data storage system 262. The data pages of 316a may be processed and sent to the remote system 262 in a manner similar to that as described above in connection with 310a.

At time T5 after the data pages 316a accessed using MD leaf4 316 have been processed as needed for the migration or replication, processing is performed as represented by row T5 of the matrix 510. As indicated by entries 505a-d of the row T5 of the matrix 510, MD page mid 2 306 and MD page leaf4 316 are removed from the cache, and MD page mid 3 308 and MD page leaf5 318 are loaded into the cache. Element 520e indicates the contents of the cache after implementing the cache removals and additions as denoted by row T5. At this point, processing is performed for the one or more user data pages 318a mapped to, or pointed to, by the MD leaf5 page 318. As noted elsewhere herein, the data pages 318a include user data stored on particular logical addresses of the LUN A's logical address space. In at least one embodiment, such processing of the data pages identified by 318a may include reading the data pages from the back-end PDs of the system 252 and sending the data pages to the target or remote data storage system 262. The data pages of 318a may be processed and sent to the remote system 262 in a manner similar to that as described above in connection with 310a.

At time T6 after the data pages 318a accessed using MD leaf5 318 have been processed as needed for the migration or replication, processing is performed as represented by row T6 of the matrix 510. As indicated by entries 506a-b of the row T6 of the matrix 510, MD page leaf 318 is removed from the cache and MD page leaf 6 is loaded into the cache. Element 520f indicates the contents of the cache after implementing the cache removals and additions as denoted by row T6. At this point, processing is performed for the one or more user data pages 320a mapped to, or pointed to, by the MD leaf6 page 320. As noted elsewhere herein, the data pages 320a include user data stored on particular logical addresses of the LUN A's logical address space. In at least one embodiment, such processing of the data pages identified by 320a may include reading the data pages from the back-end PDs of the system 252 and sending the data pages to the target or remote data storage system 262. The data pages of 320a may be processed and sent to the remote system 262 in a manner similar to that as described above in connection with 310a.

Once processing of the data pages 320a is complete, all MD pages stored in the cache as denoted by 520f may be removed from the cache.

Generally, MD for a single LUN such as LUN A 254 may be stored in one or more tree structures. If there are multiple tree structures, such as multiple instances of the tree of FIG. 4, including the MD for LUN A, the one or more additional trees of MD may be processed in a manner similar to that as just described.

FIG. 6 illustrates an embodiment in which the number of cache pages stored in the cache is 3, or more generally M, the number of maximum number of levels in the tree. As a variation, an embodiment may increase the number of cache pages stored in the cache to be more than M, such as more than 3 in connection with the particular tree of FIG. 4, to allow for prefetching one or more additional MD pages into the cache. The particular one or more MD pages fetched are the next MD pages in the sequence 352 as in FIG. 5. An embodiment may generally allow for prefetching any suitable number of one or more MD pages into the cache. What will now be described in connection with FIG. 7 is one embodiment in which the maximum number of MD pages in the cache at any point in time is 5 and wherein prefetching is performed for one or more MD pages needed to access the next set of data pages using the next MD page leaf node in the sequence 352.

Figure 7:
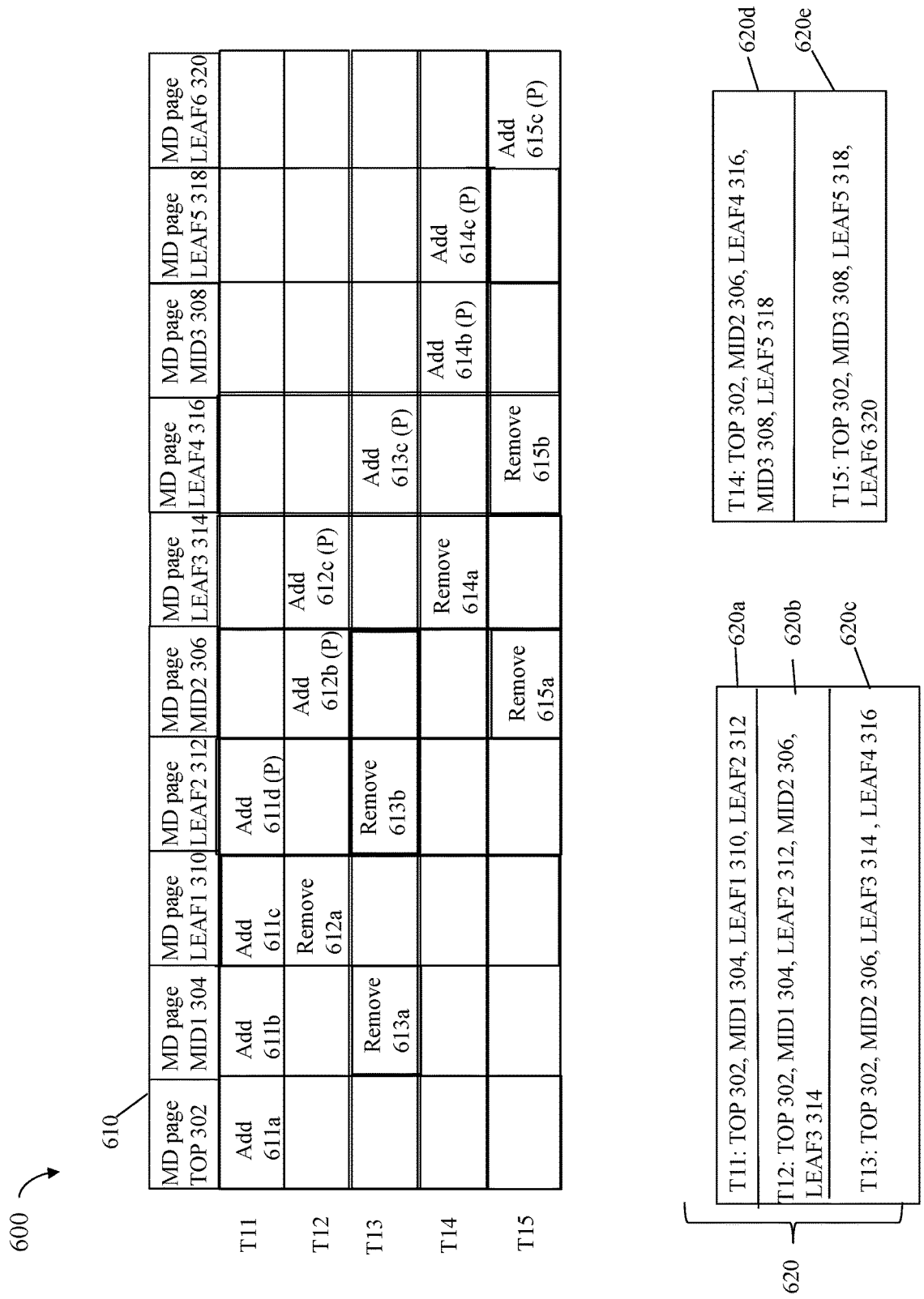

Referring to FIG. 7, shown is another example 600 illustrating use of techniques herein where no more than 5 pages of cache storage are consumed in connection with the migration or replication of the LUN A 254. The example 600 of FIG. 7 denotes when the particular MD pages are loaded into the cache and subsequently removed or unloaded from the cache in accordance with the sequence 352 of FIG. 5.

Element 610 takes the form of a matrix with columns corresponding to each of the MD pages from the sequence 352 of MD cache pages. Thus, the column identifiers (IDs) denote a particular MD page of the tree of FIG. 4. Element 610 includes rows denoting 5 different points in time, T11 through T15, indicating what one or more particular MD pages are added or loaded into the cache and what one or more particular MD pages are removed or unloaded from the cache. Thus, the row identifiers (IDs) denote a particular one of the 5 points in time T11 through T15. A cell or entry in the matrix 610 may be empty, or otherwise indicates an action taken with respect to a particular MD page (as denoted by the column ID) at a particular point in time (as denoted by the row ID). An empty cell or entry of the matric 610 indicates there is no action performed with respect to the particular MD page denoted by the column ID at that particular point in time as denoted by the row ID. It should be noted that T11-T15 denotes 5 sequential consecutive points in time where T11 denotes a first of the 5 points in time, T12 denotes a second of the 5 points in time, T13 denotes a third of the 5 points in time, T14 denotes a fourth of the 5 points in time, and T15 denotes the last or fifth of the 5 points in time.

Element 620 denotes the contents of the pages stored in the cache at each of the 5 different points in time T11 through T15 based on the indicated actions denoted by the matrix 610. Generally, the matrix 610 characterizes the cache management policy or rules used for managing the cache locations used for cache MD pages in connection with the migration or replication of the LUN A on the source system 252.

As indicated by entries 611a-d of the first row T11 of the matrix 610, at the first point in time T11, MD pages top 302, mid1 304, leaf1 310 and leaf2 312 are loaded into the cache. MD pages 302, 304 and 310 are needed for processing at the current point in time and MD page 312 is prefetched and needed in connection with accessing the next set of user data on data pages 312a. Element 620a indicates the contents of the cache after the 4 MD pages 302, 304, 310 and 312 are loaded into the cache. After the cache pages are loaded at time T11 as denoted by 620a, processing is performed for the one or more user data pages 310a mapped to, or pointed to, by the MD leaf1 page 310. As noted elsewhere herein, the data pages 310a include user data stored on particular logical addresses of the LUN A's logical address space. In at least one embodiment, such processing of the data pages identified by 310a may include reading the data pages from the back-end PDs of the system 252 and sending the data pages to the target or remote data storage system 262 as described elsewhere herein.

At time T12 after the data pages 310a accessed using MD leaf1 310 have been processed as needed for the migration or replication, processing is performed as represented by row T12 of the matrix 610. As indicated by entries 612a-c of the row T12 of the matrix 610, MD page leaf1 310 is removed from the cache and the MD page mid 2 306 and leaf 3 314 are loaded into the cache. MD pages 302, 304 and 312 are needed for processing at the current point in time and MD pages 306 and 314 are prefetched and needed in connection with accessing the next set of user data on data pages 314a. Element 620b indicates the contents of the cache after performing the actions as indicated by row T12 of the matrix 610. At this point, processing is performed for the one or more user data pages 312a mapped to, or pointed to, by the MD leaf2 page 312. As noted elsewhere herein, the data pages 312a include user data stored on particular logical addresses of the LUN A's logical address space. In at least one embodiment, such processing of the data pages identified by 312a may include reading the data pages from the back-end PDs of the system 252 and sending the data pages to the target or remote data storage system 262. The data pages of 312a may be processed and sent to the remote system 262 in a manner similar to that as described above in connection with 310a.

At time T13 after the data pages 312a accessed using MD leaf2 312 have been processed as needed for the migration or replication, processing is performed as represented by row T13 of the matrix 610. As indicated by entries 613a-c of the row T13 of the matrix 610, MD pages 304 and 312 are removed from the cache and MD page 316 is added to the cache. MD pages 302, 306 and 314 are needed for processing at the current point in time and MD page 316 is prefetched and needed in connection with accessing the next set of user data on data pages 316a. Element 620c indicates the contents of the cache after implementing the cache removals and additions as denoted by row T13. At this point, processing is performed for the one or more user data pages 314a mapped to, or pointed to, by the MD leaf3 page 314. As noted elsewhere herein, the data pages 314a include user data stored on particular logical addresses of the LUN A's logical address space. In at least one embodiment, such processing of the data pages identified by 314a may include reading the data pages from the back-end PDs of the system 252 and sending the data pages to the target or remote data storage system 262. The data pages of 314a may be processed and sent to the remote system 262 in a manner similar to that as described above in connection with 310a.

At time T14 after the data pages 314a accessed using MD leaf3 314 have been processed as needed for the migration or replication, processing is performed as represented by row T14 of the matrix 610. As indicated by entries 614a-c of the row T14 of the matrix 610, MD page 314 is removed and MD pages 308 and 318 are loaded into the cache. MD pages 302, 306 and 316 are needed for processing at the current point in time and MD pages 308 and 318 are prefetched and needed in connection with accessing the next set of user data on data pages 318a. Element 620d indicates the contents of the cache after implementing the cache removals and additions as denoted by row T14. At this point, processing is performed for the one or more user data pages 316a mapped to, or pointed to, by the MD leaf4 page 316. As noted elsewhere herein, the data pages 316a include user data stored on particular logical addresses of the LUN A's logical address space. In at least one embodiment, such processing of the data pages identified by 316a may include reading the data pages from the back-end PDs of the system 252 and sending the data pages to the target or remote data storage system 262. The data pages of 316a may be processed and sent to the remote system 262 in a manner similar to that as described above in connection with 310a.

At time T15 after the data pages 316a accessed using MD leaf4 316 have been processed as needed for the migration or replication, processing is performed as represented by row T15 of the matrix 610. As indicated by entries 615a-c of the row T15 of the matrix 610, MD pages 306 and 316 are removed from the cache, and MD page 320 is loaded into the cache. MD pages 302, 308 and 318 are needed for processing at the current point in time and MD page 320 is prefetched and needed in connection with accessing the next set of user data on data pages 320a. Element 620e indicates the contents of the cache after implementing the cache removals and additions as denoted by row T15. At this point, processing is performed for the one or more user data pages 318a mapped to, or pointed to, by the MD leaf5 page 318. As noted elsewhere herein, the data pages 318a include user data stored on particular logical addresses of the LUN A's logical address space. In at least one embodiment, such processing of the data pages identified by 318a may include reading the data pages from the back-end PDs of the system 252 and sending the data pages to the target or remote data storage system 262. The data pages of 318a may be processed and sent to the remote system 262 in a manner similar to that as described above in connection with 310a.

In this example, assume that only the single tree of MD pages of FIG. 4 includes all the MD pages for the LUN A being migrated. At the next time T16, processing is performed for the one or more user data pages 320a mapped to, or pointed to, by the MD leaf6 page 320. As noted elsewhere herein, the data pages 320a include user data stored on particular logical addresses of the LUN A's logical address space. In at least one embodiment, such processing of the data pages identified by 320a may include reading the data pages from the back-end PDs of the system 252 and sending the data pages to the target or remote data storage system 262. The data pages of 320a may be processed and sent to the remote system 262 in a manner similar to that as described above in connection with 310a. Once processing of the data pages 320a is complete, all MD pages stored in the cache as denoted by 620e may be removed from the cache. It should be noted that MD page 318 may also be removed from the cache once processing of the data pages 318a has completed.

Generally, MD for a single LUN such as LUN A 254 may be stored in one or more tree structures. If there are multiple tree structures, such as multiple instances of the tree of FIG. 4, including the MD for LUN A, the one or more additional trees of MD may be processed in a manner similar to that as just described in connection with FIG. 7. Additionally, the removal and addition of MD pages of the next tree structure may be integrated into the current sequence of MD pages loaded and removed for the current tree. For example, at time T16 (the next point in time following T15), MD page 318 may be removed and MD pages 302, mid 304 and leaf1 310 of the next tree may be prefetched and loaded into the cache. In this latter case where there multiple trees, the maximum number of MD pages loaded into the cache is 6 when transitioning to the next tree structure. For example, at the time T16, the current cache contents would be TOP 302, MID 3 308, LEAF6 320, and would include the prefetched 3 MD pages 302, 304 and 310 of the next tree structure.

Figure 8:
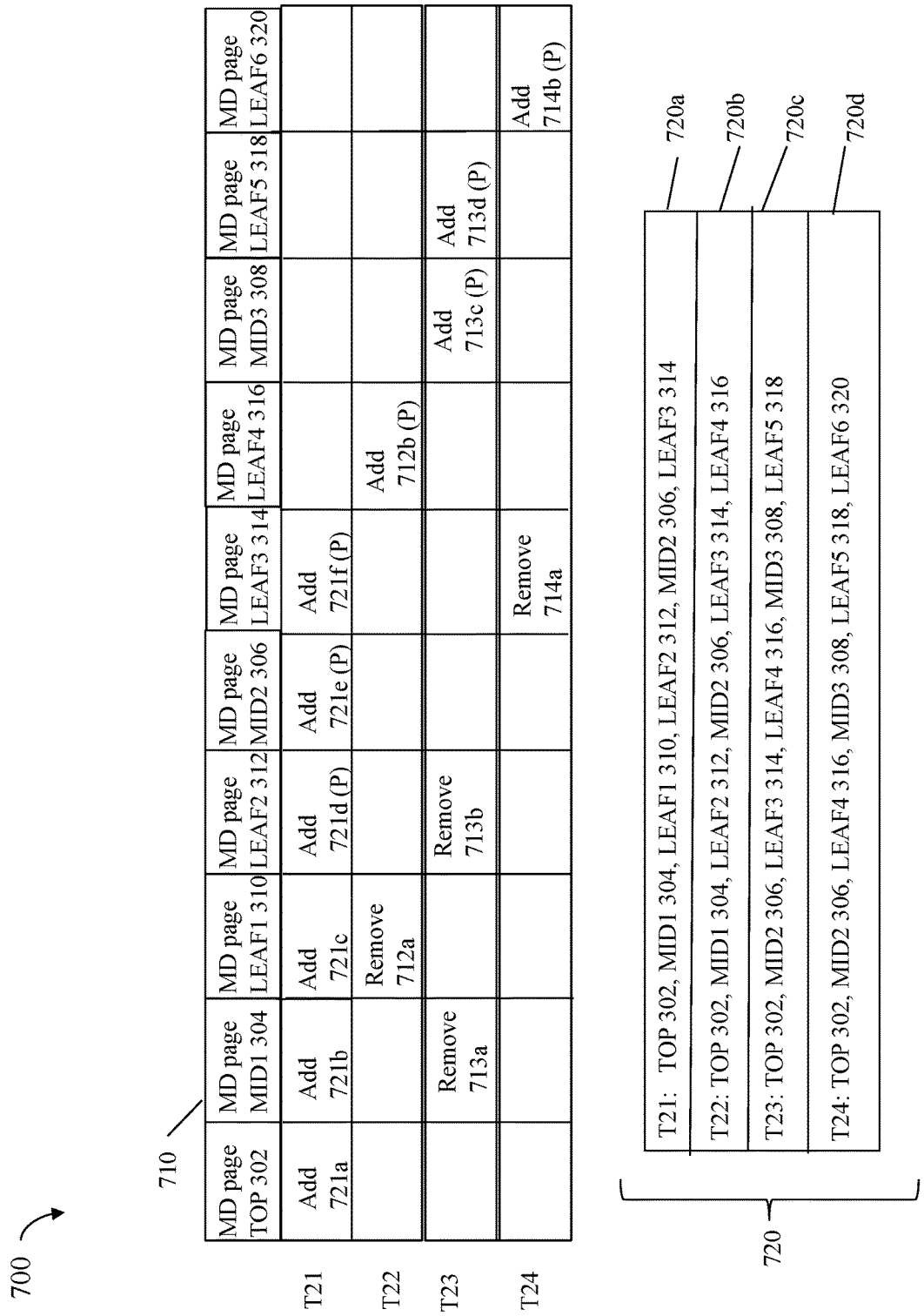

What will now be described in connection with FIG. 8 is another embodiment in which the maximum number of MD pages in the cache at any point in time is 6 and wherein prefetching is performed with a constant cache window size of 6 pages whereby at any point in time, 6 MD pages in the sequence 352 are stored in the cache. When one MD page is removed, the next MD page in the sequence 352 is loaded into the cache.

Referring to FIG. 8, shown is another example 700 illustrating use of techniques herein where no more than 6 pages of cache storage are consumed in connection with the migration or replication of the LUN A 254. The example 700 of FIG. 8 denotes when the particular MD pages are loaded into the cache and subsequently removed or unloaded from the cache in accordance with the sequence 352 of FIG. 5.

Element 710 takes the form of a matrix with columns corresponding to each of the MD pages from the sequence 352 of MD cache pages. Thus, the column identifiers (IDs) denote a particular MD page of the tree of FIG. 4. Element 710 includes rows denoting 5 different points in time, T21 through T24, indicating what one or more particular MD pages are added or loaded into the cache and what one or more particular MD pages are removed or unloaded from the cache. Thus, the row identifiers (IDs) denote a particular one of the 4 points in time T21 through T24. A cell or entry in the matrix 710 may be empty, or otherwise indicates an action taken with respect to a particular MD page (as denoted by the column ID) at a particular point in time (as denoted by the row ID). An empty cell or entry of the matric 710 indicates there is no action performed with respect to the particular MD page denoted by the column ID at that particular point in time as denoted by the row ID. It should be noted that T21-T24 denotes 4 sequential consecutive points in time where T21 denotes a first of the 4 points in time, T22 denotes a second of the 4 points in time, T23 denotes a third of the 4 points in time, and T24 denotes the fourth of the 4 points in time.

Element 720 denotes the contents of the pages stored in the cache at each of the 4 different points in time T21 through T24 based on the indicated actions denoted by the matrix 710. Generally, the matrix 710 characterizes the cache management policy or rules used for managing the cache locations used for cache MD pages in connection with the migration or replication of the LUN A on the source system 252.

As indicated by entries 721a-f of the first row T21 of the matrix 710, at the first point in time T21, MD pages top 302, mid1 304, leaf1 310, leaf2 312, leaf3 314 and mid2 306 are loaded into the cache. MD pages 302, 304 and 310 are needed for processing at the current point in time and MD pages 312 306 and 314 are prefetched. Element 720a indicates the contents of the cache after the 6 MD pages 302, 304, 310, 312, 306 and 314 are loaded into the cache. After the cache pages are loaded at time T21 as denoted by 720a, processing is performed for the one or more user data pages 310a mapped to, or pointed to, by the MD leaf1 page 310. As noted elsewhere herein, the data pages 310a include user data stored on particular logical addresses of the LUN A's logical address space. In at least one embodiment, such processing of the data pages identified by 310a may include reading the data pages from the back-end PDs of the system 252 and sending the data pages to the target or remote data storage system 262 as described elsewhere herein.

At time T22 after the data pages 310a accessed using MD leaf1 310 have been processed as needed for the migration or replication, processing is performed as represented by row T22 of the matrix 710. As indicated by entries 722a-b of the row T22 of the matrix 710, MD page leaf1 310 is removed from the cache and the MD page leaf4 316 is loaded into the cache. MD pages 302, 304 and 312 are needed for processing at the current point in time and MD pages 306, 314 and 316 are prefetched. Element 720b indicates the contents of the cache after performing the actions as indicated by row T22 of the matrix 710. At this point, processing is performed for the one or more user data pages 312a mapped to, or pointed to, by the MD leaf2 page 312. As noted elsewhere herein, the data pages 312a include user data stored on particular logical addresses of the LUN A's logical address space. In at least one embodiment, such processing of the data pages identified by 312a may include reading the data pages from the back-end PDs of the system 252 and sending the data pages to the target or remote data storage system 262. The data pages of 312a may be processed and sent to the remote system 262 in a manner similar to that as described above in connection with 310a.

At time T23 after the data pages 312a accessed using MD leaf2 312 have been processed as needed for the migration or replication, processing is performed as represented by row T23 of the matrix 710. As indicated by entries 713a-c of the row T23 of the matrix 710, MD pages 304 and 312 are removed from the cache and MD page 308 and 318 added to the cache. MD pages 302, 306 and 314 are needed for processing at the current point in time and MD pages 316, 308 and 318 have been prefetched. Element 720c indicates the contents of the cache after implementing the cache removals and additions as denoted by row T23. At this point, processing is performed for the one or more user data pages 314a mapped to, or pointed to, by the MD leaf3 page 314. As noted elsewhere herein, the data pages 314a include user data stored on particular logical addresses of the LUN A's logical address space. In at least one embodiment, such processing of the data pages identified by 314a may include reading the data pages from the back-end PDs of the system 252 and sending the data pages to the target or remote data storage system 262. The data pages of 314a may be processed and sent to the remote system 262 in a manner similar to that as described above in connection with 310a.

At time T24 after the data pages 314a accessed using MD leaf3 314 have been processed as needed for the migration or replication, processing is performed as represented by row T24 of the matrix 710. As indicated by entries 714A-B of the row T24 of the matrix 710, MD page 314 is removed and MD page 320 is loaded into the cache. MD pages 302, 306 and 316 are needed for processing at the current point in time and MD pages 308, 318 and 320 have been prefetched. Element 720d indicates the contents of the cache after implementing the cache removals and additions as denoted by row T24. At this point, processing is performed for the one or more user data pages 316a mapped to, or pointed to, by the MD leaf4 page 316. As noted elsewhere herein, the data pages 316a include user data stored on particular logical addresses of the LUN A's logical address space. In at least one embodiment, such processing of the data pages identified by 316a may include reading the data pages from the back-end PDs of the system 252 and sending the data pages to the target or remote data storage system 262. The data pages of 316a may be processed and sent to the remote system 262 in a manner similar to that as described above in connection with 310a.

In this example, assume that only the single tree of MD pages of FIG. 4 includes all the MD pages for the LUN A being migrated. T25 denotes the next point in time following T24 in the specified sequence of points in time noted above in connection with FIG. 8. At the time T25 after the data pages 316a accessed using MD leaf4 316 have been processed as needed for the migration or replication, processing is performed for the replication or migration, in a manner as described above, for the one or more user data pages 318a mapped to, or pointed to, by the MD leaf5 page 318. Additionally, at time T25, MD pages 306 and 316 may be removed from the cache.

T26 denotes the next point in time following T25 in the specified sequence of points in time noted above in connection with FIG. 8. At the next time T26 after the data pages 318a accessed using the MD leaf5 318 have been processed as needed for the migration or replication, processing is performed for the replication or migration, in a manner as described above, for the one or more user data pages 320a mapped to, or pointed to, by the MD leaf6 page 320. Additionally, at time T26, MD page 318 may be removed from the cache. After the data pages 320a have been processed as needed. MD pages 302, 308 and 320 may be removed from the cache.

As noted elsewhere herein, the MD for a single LUN such as LUN A 254 may be stored in one or more tree structures. If there are multiple tree structures, such as multiple instances of the tree of FIG. 4, including the MD for LUN A, the one or more additional trees of MD may be processed in a manner similar to that as just described in connection with FIG. 8. Additionally, the removal and addition of MD pages of the next tree structure may be integrated into the current sequence of MD pages loaded and removed for the current tree.

Although FIG. 8 illustrates an example using a constant cache window size of 6 pages (e.g., twice the maximum number, M, of levels in a tree) whereby there are always 6 cache pages stored in the cache for use with the techniques herein, more generally, an embodiment may select any suitable cache window size.

Figure 9:
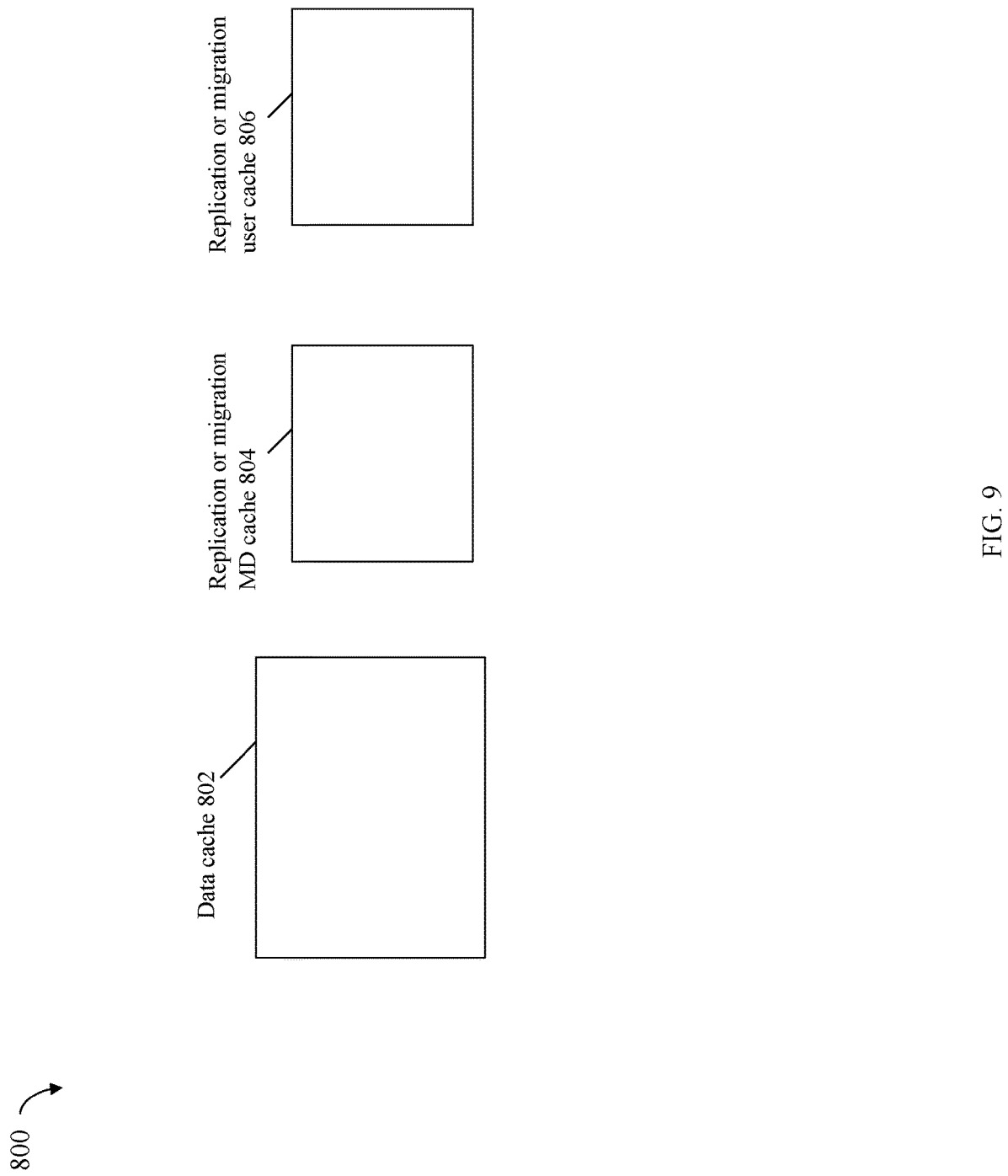
FIG. 9 is an example illustrating the different caches or logical cache partitions that may be used in an embodiment in accordance with the techniques herein.

Referring to FIG. 9, shown is an example of the various caches of the source or local data storage system 252 that may be used in an embodiment in accordance with techniques herein. The example 800 includes the data cache 802 used for other caching purposes than for storing MD and user data in accordance with the techniques described herein for migration or replication. For example, the data cache 802 may be used to store read and write data used in servicing read and write I/O operations received from a host. The data cache 802 may be managed using a first cache management policy and rules such as using an LRU eviction policy as described elsewhere herein.

The replication or migration MD cache 804 may denote the cache pages used to store MD pages in connection with the techniques herein. For example, element 804 may be the cache contents at various points in time as illustrated in 520 of FIG. 6, 620 of FIG. 7 and 820 of FIG. 8. The replication or migration MD cache 804 may be managed using a second cache management policy and rules such as described above in connection with the techniques herein, for example, such as illustrated by matrices 510 of FIG. 6, 610 of FIG. 7 and 710 of FIG. 8.

The replication or migration user data cache 806 may denote the cache pages used to store user data, or data pages, of the LUN A being migrated in connection with the techniques herein. As described herein, such data pages are accessible, for example, using the MD leaf nodes 310, 312, 314, 316, 318 and 320 of FIG. 4. The replication or migration user data cache 806 may be omitted in an embodiment where the user data is directly sent to from PDs of the source system 252 to the target or remote system 262, for example, in an embodiment using a SAN network fabric that communicates using the NVMeOF network protocol. Alternatively, the cache 806 may be used in an embodiment in connection with the techniques herein where such data pages are cached on the source system 252 prior to transmitting to the system 262. The replication or migration user data cache 806 may be managed using a third cache management policy and rules such as described above in connection with the techniques herein, where the data page is removed, evicted or otherwise marked as available or free for reuse once the data page has been transmitted to the remote system 262.

Consistent with discussion herein, the example 800 illustrates 3 separate caches 802, 804 and 806 which generally denote 3 caches or sets of cache locations each having their own cache management policy and rules as described herein. An embodiment may implement the caches 802, 804 and 806 as physically separate caches, or as 3 logical partitions of a cache memory where each such logical partition is managed using a different cache management policy and rules.

Figure 3B:
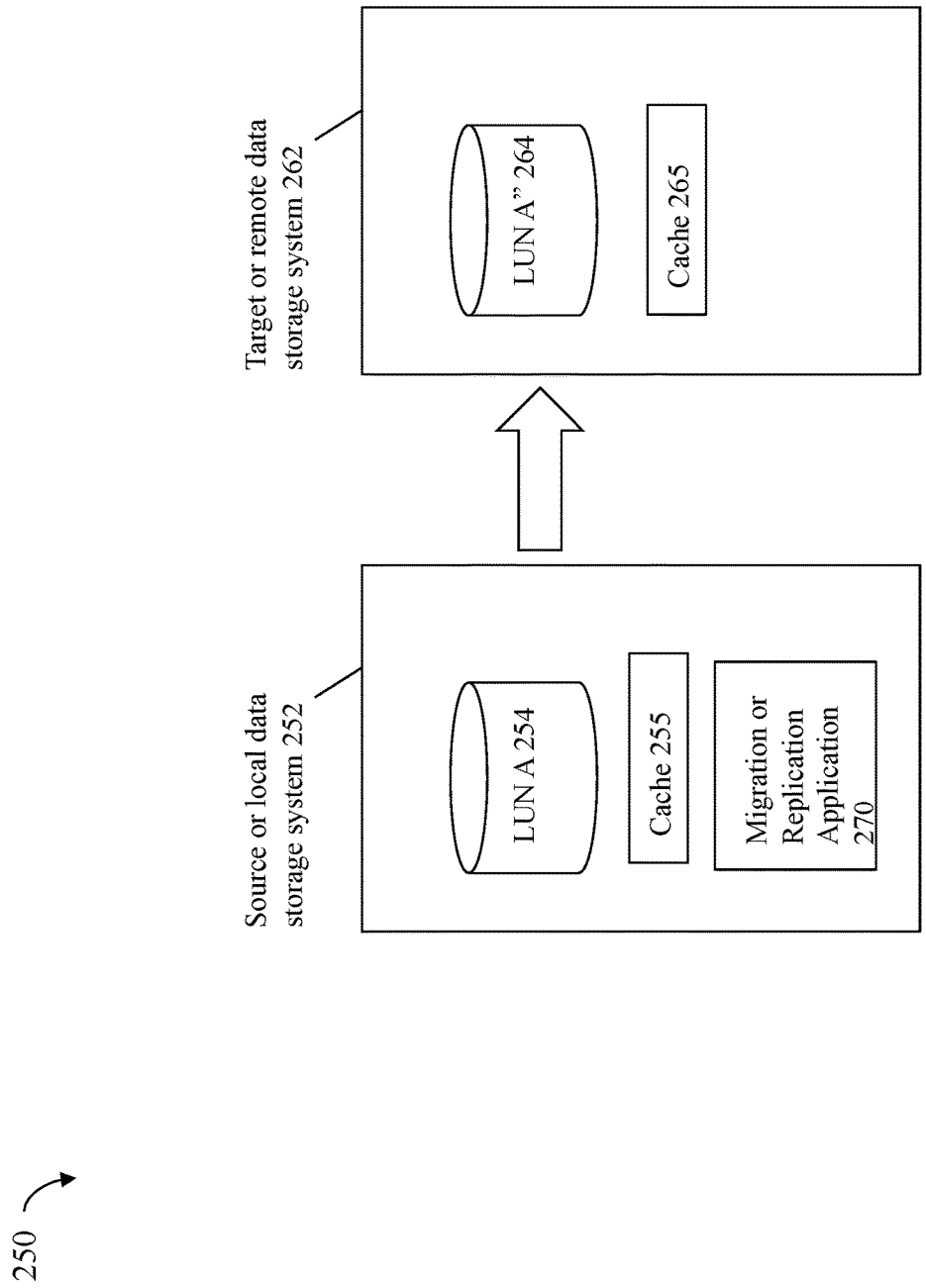
FIG. 3B is an example illustrating migration of data of a LUN from a source data storage system to a target data storage system in an embodiment in accordance with the techniques herein.

Described above are techniques that may be used to perform a data migration or replication of one or more LUNs from a source system to a target system such as illustrated in FIG. 3B. The order in which the user data is migrated or replicated, or more generally copied from the source system 252 to the target system 262, is determined by the sequential predetermined order in which the MD pages are accessed and used by the controlling migration or replication application. Thus, in one aspect, the migration or replication of the user data/data pages is driven by the MD page ordering of the predetermined sequence of MD page access or use by the application. The foregoing is in contrast to a different order in which data pages or user data stored on the LUN may be migrated, such as based on the sequential traversal of the logical address space of the LUN. For example, with reference back to FIG. 4 and as noted elsewhere herein, the data pages 310a, 312a, 314a, 316a, 318a and 320 each include user data stored on particular logical addresses of the LUN A's logical address space. It may be, for example, that element 310a includes user data stored at a first set of LBAs 0-10, 99-123, 400-499, 1000-1300; and that element 312a includes user data stored at a second set of LBAs 300-399, 500-999. Based on the defined or predetermined MD sequence as described above, the data pages of 310a are migrated or replicated and then at a later point in time the data pages of 312a are migrated or replicated. In this example, the order in which the user data is migrated is based on the MD sequence and the order in which the particular MD leaf pages accessing the data pages are loaded into the cache. So, in this example, data stored at the first set of LBAs is migrated or replicated prior to the second set of LBAs. Generally, the particular LBAs of the LUN mapped to each MD page may vary with embodiment. For example, in at least one embodiment, sequential subranges of the LUN's logical address space may be mapped to the MD page leaves. However, the techniques described herein are not limited to any particular correspondence between the LUN LBAs and the different MD page leaves. More generally, as discussed herein, the migration of the user data stored on the LUN is drive by the defined sequence of MD pages such as based on the depth-first traversal of the tree.

Using the knowledge of the predetermined sequence regarding the MD page ordering, an embodiment may specify a caching policy for such MD pages that retains the MD pages in cache at various points in time as needed by the migration or replication application in order to avoid cache misses, avoid reloading MD pages into cache and achieve a 100% cache hit ratio. The caching policy for the MD pages may also evict MD pages from cache when no longer needed based on the MD page sequence to provide for efficient utilization of the cache. An embodiment may ensure that the necessary MD pages as indicated by the sequence of MD pages are stored or loaded in the cache prior to being utilized or needed at different points in time by the replication or migration processing of the application.

Figure 10:
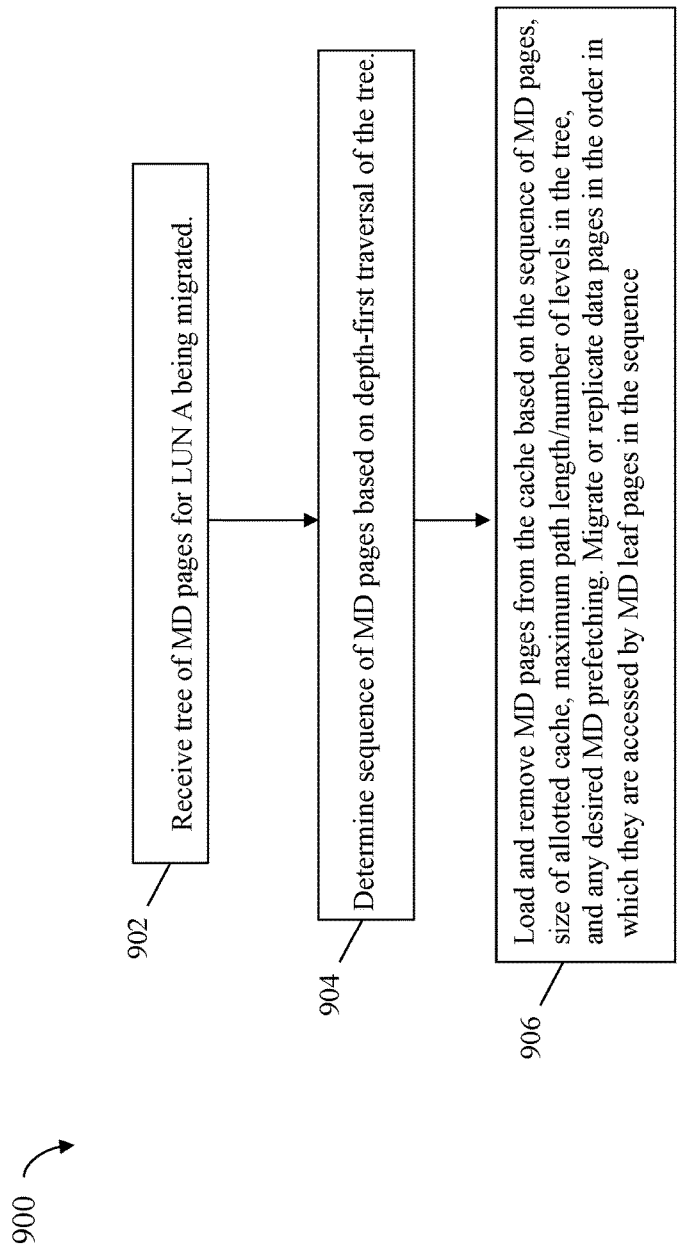
FIG. 10 is a flowchart of processing steps that may be performed in an embodiment in accordance with the techniques herein.

Referring to FIG. 10, shown is a flowchart of processing steps that may be performed in an embodiment in accordance with the techniques herein. The flowchart 900 summarizes processing described above. For simplicity, it is assumed that all MD pages for a LUN A being migrated is included in a single tree of MD pages. However, it is generally straightforward as described herein to further utilize the processing of the flowchart 900 for a LUN having its MD pages in multiple trees. Additionally, the flowchart 900 processing may be repeated for other LUNs.

At the step 902, a tree of MD pages for LUN A is received. From the step 902, control proceeds to the step 904. At the step 904, the sequence of MD pages is determined based on the depth-first traversal of the tree. As described above the sequence denotes the order in which the MD pages are accessed and utilized by the replication or migration application. From the step 904, control proceeds to the step 906. At the step 906, processing is performed to load and remove MD pages from the cache based on the sequence of MD pages, the size of allotted cache, the maximum path length (e.g., "M", the maximum number of levels in the tree), and any desired MD prefetching. The size of the allotted cache may denote the maximum number of MD pages that can be stored in the cache at a single point in time for use with the techniques herein. For example, with reference back to FIG. 6, if the cache size is only large enough to hold 3 MD pages and the maximum number of levels in the tree or path length is also 3, no prefetching is possible. The step 906 also includes processing to migrate or replicate data pages of the LUN A in the order in which they are accessed by the MD leaf pages in the sequence (e.g., as such MD leaf pages in the sequence are loaded into the cache).

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving a hierarchical structure of metadata (MD) pages for a logical device; and
performing first processing to copy data stored on the logical device from a source system to a target system, the first processing including:
determining a sequence of the MD pages of the logical device in accordance with a depth first traversal of the hierarchical structure;
defining a cache management policy in accordance with the sequence that indicates, at various points in time, when to load the MD pages into a cache and when to remove the MD pages from the cache;
loading the MD pages into the cache and removing MD pages from the cache at the various points in time and in accordance with the cache management policy; and
copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the cache management policy includes one or more rules that indicate to prefetch one or more MD pages of the hierarchical structure into the cache in accordance with a sequential order in which the MD pages of the sequence are accessed, and wherein the cache management policy further indicates that M, a maximum number of MD pages allowed to be stored in the cache, is equal to a mathematical sum of N and P, wherein N denotes a maximum number of levels in the hierarchical structure, and wherein P denotes a maximum number of prefetched MD pages allowed to be stored in the cache, wherein the cache management policy indicates that each parent MD page of the hierarchical structure remains resident in the cache until processing of all child MD pages of said each parent MD page of the hierarchical structure has completed, and wherein said copying the data pages further comprises:

responsive to loading a first leaf MD page of the sequence into the cache, copying a first plurality of the data pages referenced by the first leaf MD page from the source system to the target system.

2. The method of claim 1, wherein the hierarchical structure is a tree.

3. The method of claim 2, wherein the tree includes 3 levels, wherein the 3 levels includes a first MD page as a root at a first level, a first plurality of MD pages at a second level, and a second plurality of MD pages at a third level.

4. The method of claim 3, wherein the first plurality of MD pages are children of the first MD page, and each MD page of the second plurality of MD pages of the third level is a child of one of the MD pages of the first plurality of MD pages of the second level.

5. The method of claim 4, wherein the second plurality of MD pages at the third level are leaf MD pages, and wherein each of the leaf MD pages accesses one or more pages of data stored on the logical device.

6. The method of claim 5, wherein the cache management policy indicates that each of the leaf MD pages of the third level is removed from the cache after processing is completed for copying data, stored at logical addresses of the logical device accessed by said each leaf MD page, from the source system to the target system.

7. The method of claim 6, wherein the cache management policy indicates that when a leaf MD page of the third level is loaded in the cache, then the first MD page that is the root and a parent MD page of the leaf MD page are resident in the cache.

8. The method of claim 6, wherein the cache is included in the source system and wherein the data pages accessed by the leaf MD pages are copied from one or more physical storage devices of the source system to the cache of the source system, and then transmitted from the cache of the source system to the target system over a network connection.

9. The method of claim 1, the first processing, that copies data of the logical device from the source system to the target system, is included in processing performed for replicating or migrating data of the logical device from the source system to the target system.

10. The method of claim 1, wherein the source system is a data storage system and the target system is a second data storage system.

11. The method of claim 1, wherein the cache management policy is a first separate cache management policy used in connection with management of MD pages stored in the cache for migration or replication, and wherein a second different cache management policy is general cache management policy used in connection with storing other content, besides MD pages, in the cache.

12. The method of claim 1, wherein the hierarchical structure of MD pages for the logical device is used in connection with mapping logical addresses of the logical device to physical storage locations including content stored at the logical addresses of the logical device.

13. A system comprising:
a processor; and
a memory comprising code stored thereon that, when executed, performs a method of processing data comprising:
receiving a hierarchical structure of metadata (MD) pages for a logical device; and
performing first processing to copy data stored on the logical device from a source system to a target system, the first processing including:
determining a sequence of the MD pages of the logical device in accordance with a depth first traversal of the hierarchical structure;
defining a cache management policy in accordance with the sequence that indicates, at various points in time, when to load the MD pages into a cache and when to remove the MD pages from the cache;
loading the MD pages into the cache and removing MD pages from the cache at the various points in time and in accordance with the cache management policy; and
copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the cache management policy includes one or more rules that indicate to prefetch one or more MD pages of the hierarchical structure into the cache in accordance with a sequential order in which the MD pages of the sequence are accessed, and wherein the cache management policy further indicates that M, a maximum number of MD pages allowed to be stored in the cache, is equal to a mathematical sum of N and P, wherein N denotes a maximum number of levels in the hierarchical structure, and wherein P denotes a maximum number of prefetched MD pages allowed to be stored in the cache, wherein the cache management policy indicates that each parent MD page of the hierarchical structure remains resident in the cache until processing of all child MD pages of said each parent MD page of the hierarchical structure has completed, and wherein said copying the data pages further comprises:
responsive to loading a first leaf MD page of the sequence into the cache, copying a first plurality of the data pages referenced by the first leaf MD page from the source system to the target system.

14. A non-transitory computer readable medium comprising code stored thereon that, when executed, performs a method of processing data comprising:
receiving a hierarchical structure of metadata (MD) pages for a logical device; and
performing first processing to copy data stored on the logical device from a source system to a target system, the first processing including:
determining a sequence of the MD pages of the logical device in accordance with a depth first traversal of the hierarchical structure;
defining a cache management policy in accordance with the sequence that indicates, at various points in time, when to load the MD pages into a cache and when to remove the MD pages from the cache;

loading the MD pages into the cache and removing MD pages from the cache at the various points in time and in accordance with the cache management policy; and copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the cache management policy includes one or more rules that indicate to prefetch one or more MD pages of the hierarchical structure into the cache in accordance with a sequential order in which the MD pages of the sequence are accessed, and wherein the cache management policy further indicates that M, a maximum number of MD pages allowed to be stored in the cache, is equal to a mathematical sum of N and P, wherein N denotes a maximum number of levels in the hierarchical structure, and wherein P denotes a maximum number of prefetched MD pages allowed to be stored in the cache, wherein the cache management policy indicates that each parent MD page of the hierarchical structure remains resident in the cache until processing of all child MD pages of said each parent MD page of the hierarchical structure has completed, and wherein said copying the data pages further comprises:

responsive to loading a first leaf MD page of the sequence into the cache, copying a first plurality of the data pages referenced by the first leaf MD page from the source system to the target system.

15. The non-transitory computer readable medium of claim 14, wherein the hierarchical structure is a tree.

16. The non-transitory computer readable medium of claim 15, wherein the tree includes 3 levels, wherein the 3 levels includes a first MD page as a root at a first level, a first plurality of MD pages at a second level, and a second plurality of MD pages at a third level.

17. The non-transitory computer readable medium of claim 16, wherein the first plurality of MD pages are children of the first MD page, and each MD page of the second plurality of MD pages of the third level is a child of one of the MD pages of the first plurality of MD pages of the second level.

18. The non-transitory computer readable medium of claim 17, wherein the second plurality of MD pages at the third level are leaf MD pages, and wherein each of the leaf MD pages accesses one or more pages of data stored on the logical device.

19. A method of processing data comprising:
receiving a hierarchical structure of metadata (MD) pages for a logical device; and
performing first processing to copy data stored on the logical device from a source system to a target system, the first processing including:
determining a sequence of the MD pages of the logical device in accordance with a depth first traversal of the hierarchical structure;
defining a cache management policy in accordance with the sequence that indicates, at various points in time, when to load the MD pages into a cache of the source system and when to remove the MD pages from the cache of the source system;
loading the MD pages into the cache of the source system and removing MD pages from the cache of the source system at the various points in time and in accordance with the cache management policy; and
copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the MD pages of the hierarchical structure include leaf MD pages and the leaf MD pages access the data pages stored on the logical device, and wherein the data pages accessed by the leaf MD pages are directly copied, over a network connection, from one or more physical storage devices of the source system to one or more other physical storage devices of the target system without storing the data pages in the cache of the source system.

20. The method of claim 19, wherein the data pages accessed by the leaf MD pages are directly copied, over a network connection, from one or more physical storage devices of the source system to one or more other physical storage devices of the target system without storing the data pages in another cache of the target system.

21. A system comprising:
one or more processors; and
a memory comprising code stored therein that, when executed, performs a method of processing data comprising:
receiving a hierarchical structure of metadata (MD) pages for a logical device; and
performing first processing to copy data stored on the logical device from a source system to a target system, the first processing including:
determining a sequence of the MD pages of the logical device in accordance with a depth first traversal of the hierarchical structure;
defining a cache management policy in accordance with the sequence that indicates, at various points in time, when to load the MD pages into a cache of the source system and when to remove the MD pages from the cache of the source system;
loading the MD pages into the cache of the source system and removing MD pages from the cache of the source system at the various points in time and in accordance with the cache management policy; and
copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the MD pages of the hierarchical structure include leaf MD pages and the leaf MD pages access the data pages stored on the logical device, and wherein the data pages accessed by the leaf MD pages are directly copied, over a network connection, from one or more physical storage devices of the source system to one or more other physical storage devices of the target system without storing the data pages in the cache of the source system.

22. A non-transitory computer readable medium comprising code stored thereon that, when executed, performs a method of processing data comprising:

receiving a hierarchical structure of metadata (MD) pages for a logical device; and performing first processing to copy data stored on the logical device from a source system to a target system, the first processing including:

determining a sequence of the MD pages of the logical device in accordance with a depth first traversal of the hierarchical structure;

defining a cache management policy in accordance with the sequence that indicates, at various points in time, when to load the MD pages into a cache of the source system and when to remove the MD pages from the cache of the source system;

loading the MD pages into the cache of the source system and removing MD pages from the cache of the source system at the various points in time and in accordance with the cache management policy; and copying data pages stored at logical addresses of the logical device from the source system to the target system, wherein said copying of the data pages is performed in an order in which the logical addresses are accessed using one or more of the MD pages stored in the cache at the various points in time in accordance with the cache management policy, wherein the MD pages of the hierarchical structure include leaf MD pages and the leaf MD pages access the data pages stored on the logical device, and wherein the data pages accessed by the leaf MD pages are directly copied, over a network connection, from one or more physical storage devices of the source system to one or more other physical storage devices of the target system without storing the data pages in the cache of the source system.

* * * * *